United States Patent
Kang et al.

(10) Patent No.: US 11,636,177 B2
(45) Date of Patent: Apr. 25, 2023

(54) OBJECT DETECTION DATASET CONSTRUCTION METHOD USING IMAGE ENTROPY AND DATA PROCESSING DEVICE PERFORMING THE SAME

(71) Applicant: Konan Technology Inc., Seoul (KR)

(72) Inventors: Hyunsu Kang, Yongin-si (KR); Euncheol Kang, Jeonju-si (KR)

(73) Assignee: Konan Technology Inc., Seoul (KR)

( * ) Notice: Subject to any disclaimer, the term of this patent is extended or adjusted under 35 U.S.C. 154(b) by 210 days.

(21) Appl. No.: 17/101,241

(22) Filed: Nov. 23, 2020

(65) Prior Publication Data
US 2022/0147762 A1    May 12, 2022

(30) Foreign Application Priority Data
Nov. 9, 2020    (KR) .......................... 10-2020-0148785

(51) Int. Cl.
*G06V 10/774*    (2022.01)
*G06F 18/214*    (2023.01)
*G06T 7/11*    (2017.01)
*G06T 7/90*    (2017.01)
*G06T 7/174*    (2017.01)
*G06V 20/40*    (2022.01)
*G06F 18/24*    (2023.01)

(52) U.S. Cl.
CPC ............ *G06F 18/214* (2023.01); *G06F 18/24* (2023.01); *G06T 7/11* (2017.01); *G06T 7/174* (2017.01); *G06T 7/90* (2017.01); *G06V 20/46* (2022.01); *G06T 2207/10016* (2013.01); *G06T 2207/10024* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 2016/0217344 A1* | 7/2016 | Misra | G06V 10/764 |
| 2017/0039697 A1* | 2/2017 | Nakata | G06V 20/52 |
| 2017/0116519 A1* | 4/2017 | Johnson | G06N 3/08 |

FOREIGN PATENT DOCUMENTS

| | | | | |
|---|---|---|---|---|
| KR | 10-2168558 B1 | 10/2020 | | |
| KR | 102168558 B1 * | 10/2020 | ........... | G06F 216/50 |

OTHER PUBLICATIONS

Gao, Yue, and Qiong-Hai Dai. "Clip based video summarization and ranking." Proceedings of the 2008 international conference on Content-based image and video retrieval. 2008. (Year: 2008).*
Bengar, Javad Zolfaghari, et al. "Temporal Coherence for Active Learning in Videos." 2019 IEEE/CVF International Conference on Computer Vision Workshop (ICCVW). IEEE, 2019., (10 pages in English).
Korean Office Action dated Jan. 20, 2023, in counterpart Korean Patent Application No. 10-2020-0148785 (6 pages in Korean).

* cited by examiner

*Primary Examiner* — Sean M Conner
(74) *Attorney, Agent, or Firm* — NSIP Law

(57) ABSTRACT

Disclosed are an object detection dataset construction method using image entropy and a data processing device performing the same. The data processing device includes an input unit configured to receive multiple images, a control unit configured to choose processing priorities of the received multiple images using image entropy and construct an object detection dataset from a corresponding image according to the chosen processing priorities, and a storage unit configured to store the constructed object detection dataset.

11 Claims, 10 Drawing Sheets

| ORIGINAL IMAGE | APPLICATION OF IMAGE SEGMENTATION ALGORITHM | COMPUTATION OF IMAGE ENTROPY (N=2) |
|---|---|---|
| | | 5 / 2 = 2.5 |
| | | 17 / 2 = 8.5 |

FIG. 5

| ORIGINAL IMAGE | APPLICATION OF OBJECT DETECTION MODEL | COMPUTATION OF IMAGE ENTROPY |
|---|---|---|
|  |  | 1.1758(person) + 1.8829(person) + 0.9875(person) + 1.0582(person) + 1.2302(bottle) = 6.3346 |
|  |  | 2.4985(person) = 2.4985 |

FIG. 6

| ORIGINAL IMAGE | IMAGE ENTROPY | PROCESSING PRIORITY |
|---|---|---|
|  | 6.3346 | 2 |
|  | 2.4985 | 4 |
|  | 2.5 | 3 |
|  | 8.5 | 1 |

| SECTION IMAGE | AVERAGE IMAGE ENTROPY OF CORRESPONDING SECTION | PROCESSING PRIORITY |
|---|---|---|
|  | (6.9237 + 6.7328 + 6.5890) / 3 = 6.7485 | 1 |
|  | (2.0031 + 1.9937 + 2.0737) / 3 = 2.0235 | 2 |

FIG. 9

| IMAGE ENTROPY COMPUTATION METHOD | OBJECT ERASURE METHOD | REMARK |
|---|---|---|
| IMAGE ENTROPY COMPUTATION USING IMAGE SEGMENTATION ALGORITHM | FILLING WITH AMBIENT COLOR, FILLING WITH SURROUNDING IMAGE | |
| IMAGE ENTROPY COMPUTATION USING OBJECT DETECTION MODEL | BLACK OUT, WHITE OUT, FILLING WITH AVERAGE COLOR OF CORRESPONDING AREA | |

FIG. 10

OBJECT DETECTION DATASET CONSTRUCTION METHOD USING IMAGE ENTROPY AND DATA PROCESSING DEVICE PERFORMING THE SAME

CROSS-REFERENCE TO RELATED APPLICATION(S)

This application claims priority from Korean Patent Application No. 10-2020-0148785, filed on Nov. 9, 2020, in the Korean Intellectual Property Office, the disclosure of which is incorporated herein by reference in its entirety.

BACKGROUND

1. Field

The following description relates to data analysis and processing technology, and more particularly, to a technique for constructing a dataset for detecting an object. The present invention is derived from research conducted as a part of the national strategic project for artificial intelligence of the Ministry of Science and ICT of Korea [Project No. 2017-0-01781, Project Unique No. 1711103247, research title: (3 details) Development of Data Collection and Correction Automation System for Understanding Videos, Research Period: Jan. 1, 2020, to Dec. 31, 2020].

2. Description of Related Art

Recently, along with the rapid development of deep learning, research and services using deep learning are being conducted in various fields such as video processing, natural language processing, and machine translation as well as image processing. For such a deep learning model to perform well, high-quality data is required. In order to construct a learning model suitable for each domain, it is necessary to create its own dataset, and a high cost and a great deal of time are required to create a dataset. A process of inspecting created dataset is also expensive.

Although it costs a great deal of money to create one's own dataset, it is important to efficiently construct an appropriate dataset because deep learning models cannot be trained properly if the dataset is not appropriately constructed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to an object detection dataset construction method capable of constructing an object detection dataset by choosing the processing priority of a data construction task using image entropy and by performing an inspection to quickly find missing data or incorrectly created data, and a data processing device for performing the same.

In one general aspect, a data processing device includes an input unit configured to receive multiple images, a control unit configured to choose processing priorities of the received multiple images using image entropy and construct an object detection dataset from a corresponding image according to the chosen processing priorities, and a storage unit configured to store the constructed object detection dataset.

In an additional aspect, the control unit may compute image entropy of each image using an image segmentation algorithm or an object detection model and choose a predetermined number of images to be preferentially processed in descending order of the computed image entropy or when the computed image entropy is greater than or equal to a preset reference value.

In an additional aspect, the image entropy computation using the image segmentation algorithm may include segmenting each image into at least one color appearing in the corresponding image and computing image entropy by dividing the number of segmentation color types by preset color sensitivity.

In an additional aspect, the image entropy computation using the object detection model may include inputting a predetermined image to the object detection model, detecting objects through the object detection model, and then computing image entropy by adding scores of the detected objects.

In an additional aspect, the control unit may extract multiple frame images from a video when the video is received rather than the images, classify the extracted multiple frame images into section images of preset sections, compute average image entropy of each section from the section images of a corresponding section, and choose a predetermined number of section images to be preferentially processed in descending order of the computed average image entropy or when the computed average image entropy is greater than or equal to a preset reference value.

In an additional aspect, the control unit may perform an inspection to determine whether to re-process a constructed object detection dataset using image entropy and may determine that the object detection dataset is a final object detection dataset when the object detection dataset passes the inspection.

In an additional aspect, the control unit may erase at least one object from an image of the object detection dataset using object information, compute image entropy of the image from which at least one object is erased, and determine an image to be re-processed using the computed image entropy.

In an additional aspect, when image entropy is computed using an image segmentation algorithm, the control unit may erase at least one object through filling with ambient color or filling with a surrounding image, and when image entropy is computed using an object detection model, the control unit may erase at least one object through black-out, white-out, or filling with an average color of a corresponding area.

In an additional aspect, when the image entropy of the image from which at least one object is erased is greater than or equal to a preset reference value, the control unit may determine whether the corresponding image is to be re-processed, and the preset reference value may vary depending on a situation.

In another general aspect, a method of constructing an object detection dataset using a data processing device includes receiving multiple images, choosing processing priorities of the received multiple images using image entropy, and constructing an object detection dataset from a corresponding image according to the chosen processing priorities.

In an additional aspect, the choosing of the processing priority may include computing image entropy of each image using an image segmentation algorithm or an object detection model and choosing a predetermined number of images to be preferentially processed in descending order of the computed image entropy or when the computed image entropy is greater than or equal to a preset reference value.

In an additional aspect, the choosing of the processing priority may include extracting multiple frame images from a video when the video is received rather than the images, classifying the extracted multiple frame images into section images of preset sections, computing average image entropy of each section from the section images of a corresponding section, and choosing a predetermined number of section images to be preferentially processed in descending order of the computed average image entropy or when the computed average image entropy is greater than or equal to a preset reference value.

In an additional aspect, the method may further include performing an inspection to determine whether to re-process a constructed object detection dataset using image entropy, determining that an object detection dataset that is not to be re-processed is a final object detection dataset, and re-processing an object detection dataset to be re-processed, performing an inspection on the objected detection dataset, and determining that the object detection dataset is a final object detection dataset when the object detection dataset passes the inspection.

In an additional aspect, the performing of the inspection may include erasing at least one object from an image of the object detection dataset using object information, computing image entropy of the image from which at least one object is erased, and determining an image to be re-processed using the computed image entropy.

In an additional aspect, the determining of an image to be re-processed may include determining that a corresponding image is to be re-processed when the image entropy of the image from which at least one object is erased is greater than or equal to a preset reference value, and the preset reference value may vary depending on a situation.

Other features and aspects will be apparent from the following detailed description, the drawings, and the claims.

BRIEF DESCRIPTION OF THE DRAWINGS

FIG. 4 is a diagram showing an example of computing image entropy using a mean shift by means of an image segmentation algorithm according to an embodiment of the present invention.

FIG. 5 is a diagram showing an example of computing image entropy using an object detection model according to an embodiment of the present invention.

FIG. 6 is a diagram showing an example of computing the processing priority of an object detection dataset in an image using image entropy according to an embodiment of the present invention.

FIG. 9 is a diagram illustrating a method of erasing an object according to an image entropy computation method according to an embodiment of the present invention.

FIG. 10 is a diagram showing an example of an object detection dataset inspection method using image entropy according to an embodiment of the present invention.

Figure 1:
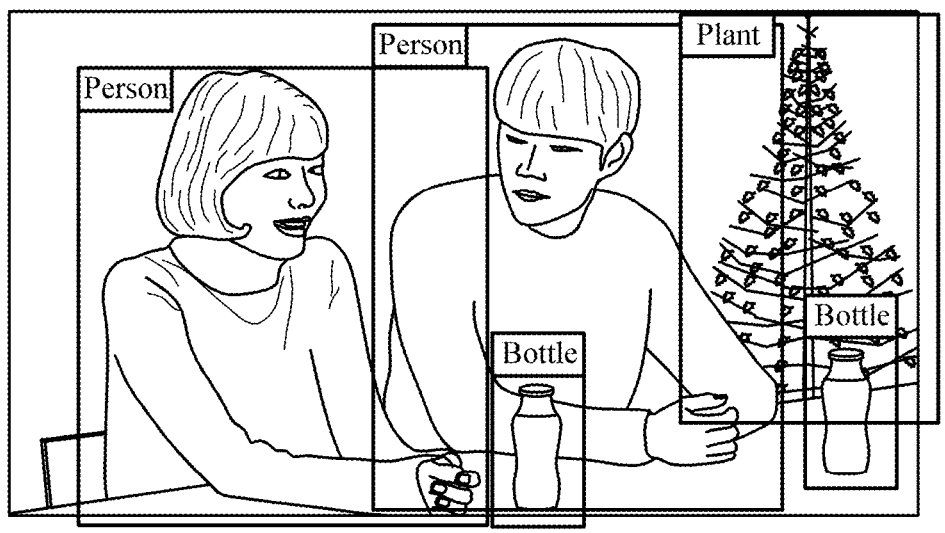
FIG. 1 is a diagram showing an example of an object detection dataset to be constructed according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Advantages and features of the present invention and implementation methods thereof will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. The present invention is merely defined by the appended claims. Like reference numerals refer to like elements throughout.

In the following description, when the detailed description of the relevant known functions or configurations is determined to unnecessarily obscure the gist of the present invention, the detailed description will be omitted. Also, terms used herein are defined in consideration of the functions of embodiments of the present invention and may be changed depending on a user, the intent of an operator, or a custom. Therefore, the definitions should be made based on the contents throughout the specification.

The combinations of the blocks of the block diagram and the operations of the flowchart may be performed by computer program instructions (execution engines), and these computer program instructions may be installed on processors of general-purpose computers, special-purpose computers, or other programmable data processing apparatuses. Thus, the instructions, which are executed via processors of computers or other programmable data processing apparatuses, create a means for performing functions specified in the blocks of the block diagram or the operations of the flowchart.

These computer program instructions may also be stored in a computer-available memory or a computer-readable memory that can direct computers or other programmable data processing apparatuses to implement the functions in a particular manner. Thus, the instructions stored in the computer-available memory or computer-readable memory can produce a manufacturing item including an instruction means for performing the functions specified in the blocks of the block diagram or the operations of the flowchart.

In addition, the computer program instructions may also be installed on computers or other programmable data processing apparatuses. Thus, a series of operations may be performed on computers or other programmable data processing apparatuses to create a computer-implemented process so that the instructions which are executed on the computers or other programmable data processing apparatuses implement actions for executing the functions specified in the blocks of the block diagram and the operations of the flowchart.

Also, it should be noted that each of the blocks or operations may represent a portion of a module, segment, or code including one or more executable instructions for implementing specified logical functions and that in some alternative embodiments, the functions specified in the blocks or operations may be performed irrespective of order. For example, two blocks or operations shown in succession may, in fact, be executed substantially concurrently, or the blocks or operations may sometimes be executed in the reverse order if necessary.

Hereinafter, embodiments of the present invention will be described in detail with reference to the accompanying drawings. However, the following embodiments of the present invention may be modified in different forms, and the scope of the present invention is not limited to the embodiments set forth herein. Embodiments of the present invention are provided for those skilled in the art to completely understand the present invention.

FIG. 1 is a diagram showing an example of an object detection dataset to be constructed according to an embodiment of the present invention.

Referring to FIG. 1, an object detection dataset is a collection of data having object information of objects shown in an image (e.g., people, a plant, and bottles of FIG. 1). The object information may include an object name, position information, and the like of a corresponding object.

By using a data creating tool such as Label Studio and CVAT, object information of each image may be created, and an object detection dataset may be created. When this is done manually for each image, it requires a great cost (e.g., manpower, time, etc.).

In order for the constructed object detection dataset to be effective, object information should be neither missing nor incorrectly created. Since all the created object detection datasets need to be manually inspected, the cost of the inspection is also very high.

Figure 2:
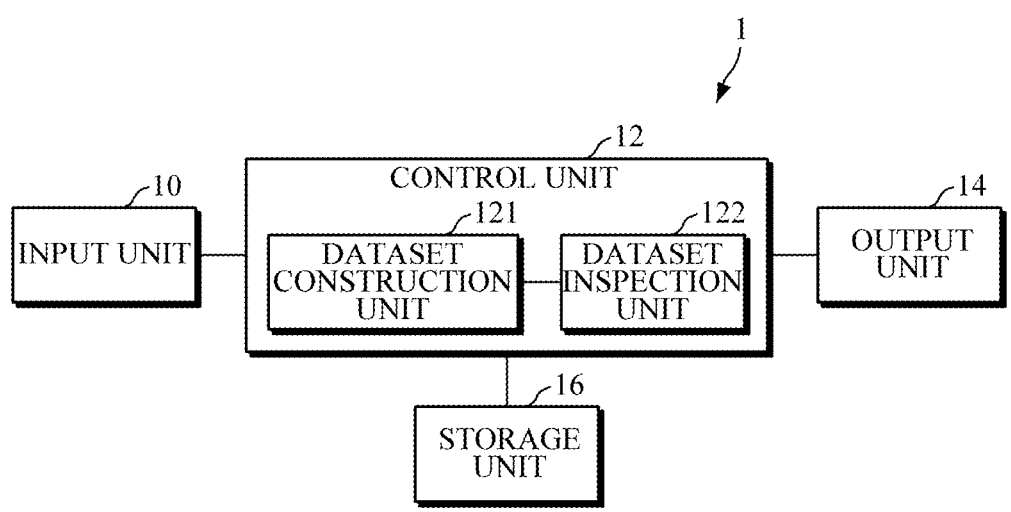
FIG. 2 is a diagram showing a configuration of a data processing device according to an embodiment of the present invention.

FIG. 2 is a diagram showing a configuration of a data processing device according to an embodiment of the present invention.

Referring to FIG. 2, a data processing device 1 constructs an object detection dataset using image entropy and efficiently inspects uncreated data or partially created data. Here, the term "construct" may be used with the same meaning as the terms "build," "create," or the like.

The data processing device 1 may be a computing device capable of performing a predetermined mathematical operation process and communication process. For example, the data processing device 1 may achieve desired system performance by using a combination of typical computer hardware (e.g., a device capable of including a computer process, a memory, a storage, an input device, an output device, and other elements of a conventional computing device, an electronic communication device such as a router and a switch, and an electronic information storage system such as a network-attached storage (NAS) or a storage area network (SAN)) and computer software (i.e., instructions that cause a computing device to function in a particular manner).

The data processing device 1 according to an embodiment includes an input unit 10, a control unit 12, an output unit 14, and a storage unit 16.

The input unit 10 may receive multiple original images.

The control unit 12 chooses the processing priorities of the received multiple original images using image entropy, constructs an object detection dataset from a corresponding image according to the chosen processing priorities, and inspects the constructed object detection dataset using image entropy to determine whether to re-process the object detection dataset.

The control unit 12 according to an embodiment includes a dataset construction unit 121 and a dataset inspection unit 122.

The dataset construction unit 121 computes the image entropy of each image using an image segmentation algorithm or an object detection model.

In the case of the image entropy computation using the image segmentation algorithm, as an example, the dataset construction unit 121 segments each image with at least one color appearing in the corresponding image and computes image entropy by dividing the number of segmentation color types by preset color sensitivity. An example of the image entropy computation using the image segmentation algorithm will be described below with reference to FIG. 4.

In the case of the image entropy computation using the object detection model, as an example, the dataset construction unit 121 inputs a predetermined image to the object detection model, detects objects through the object detection model, and then computes image entropy by adding the scores of the detected objects. An example of the image entropy computation using the object detection model will be described below with reference to FIG. 5.

Subsequently, the dataset construction unit 121 chooses a predetermined number of images to be preferentially processed in descending order of the computed image entropy or when the computed image entropy is greater than or equal to a preset reference value.

When a video is received rather than the images, the dataset construction unit 121 may extract multiple frame images from the video and may classify the extracted multiple frame images into section images of preset sections. Subsequently, the dataset construction unit 121 may compute the average image entropy of each section from the section images of a corresponding section. In this case, the dataset construction unit 121 may choose a predetermined number of section images to be preferentially processed in descending order of the computed average image entropy or when the computed average image entropy is greater than or equal to a preset reference value.

The dataset inspection unit 122 performs an inspection to determine whether to re-process a constructed object detection dataset using image entropy and determines that the object detection dataset is a final object detection dataset when the object detection dataset passes the inspection. For example, the dataset inspection unit 122 may erase at least one object from an image of an object detection dataset using object information. When image entropy is computed using the image segmentation algorithm, at least one object may be erased through filling with ambient color or filling with a surrounding image. When image entropy is computed using the object detection model, at least one object may be erased through black-out, white-out, or filling with an average color of a corresponding area.

Subsequently, the dataset inspection unit 122 computes the image entropy of an image from which at least one object is erased and determines an image to be re-processed using the computed image entropy. For example, when the image entropy of the image from which at least one object is erased is greater than or equal to a preset reference value, the dataset inspection unit 122 may determine the corresponding image as a target to be re-processed. The preset reference value can be changed depending on the situation. An inspection method of the dataset inspection unit 122 will be described with reference to FIG. 8.

The output unit 14 displays a screen provided when the data processing device 1 operates. In this case, the output unit 14 may display a construction result and an inspection result for an object detection dataset obtained through the control unit 12. The storage unit 16 stores information required for analysis by the control unit 12 and information generated according to the analysis result. The storage unit 16 may store the constructed object detection dataset.

Figure 3:
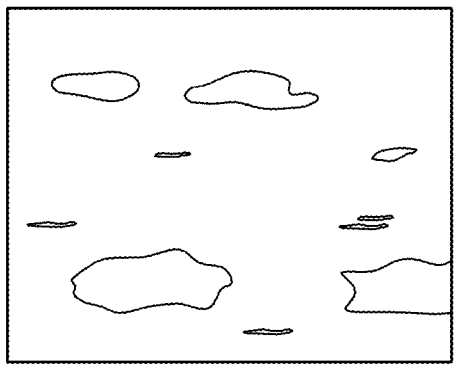
FIG. 3 is a diagram illustrating image entropy to help understand the present invention.
Figure 3:
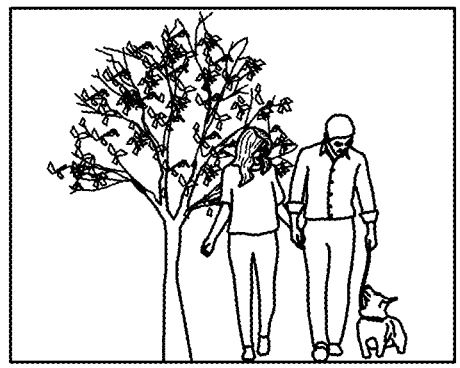

FIG. 3 is a diagram illustrating image entropy to help understand the present invention.

Image entropy refers to the expected value of the amount of image information. FIG. 3A is a photo of the sky with clouds. This photo may be regarded as having a small amount of information because the photo only has an object called a cloud. FIG. 3B is a picture of one man and one woman walking with a dog. This photo may be regarded as having a large amount of information because the photo has various objects such as a person, a dog, a dog leash, and a tree. Accordingly, the amount of image information may be regarded as being proportional to the number of objects appearing in the image.

FIG. 4 is a diagram showing an example of computing image entropy using a mean shift by means of an image segmentation algorithm according to an embodiment of the present invention.

Referring to FIG. 4, a data processing device may segment an image using a mean shift by means of an image segmentation algorithm. By using the number of colors distributed in a segmented image, the data processing device may infer the number of objects appearing in the image.

By applying the image segmentation algorithm, most objects are usually divided into two or three colors, and a simple image entropy computation equation such as Equation 1 may be obtained. When the image entropy is computed using Equation 1, it is possible to know the approximate number of object types of a corresponding image.

Image Entropy=(Number of Color Types Appearing in Image)/N [Equation 1]

(N: color sensitivity, which s recommended to have a value ranging from 2 to 3)

FIG. 4 is an example of computing image entropy using an image segmentation algorithm by setting color sensitivity (N) to 2. In the example of FIG. 4, the number of color types appearing in the upper image is 5, and the image entropy of the corresponding image is 5/2 (=2.5). The number of color types appearing in the lower image is 17, and the image entropy of the corresponding image is 17/2 (=8.5).

FIG. 5 is a diagram showing an example of computing image entropy using an object detection model according to an embodiment of the present invention.

Referring to FIG. 5, the data processing device may compute image entropy using an object detection model. The data processing device inputs a predetermined image to an object detection model and detects objects through the corresponding object detection model. As in Equation 2, the data processing device may add the scores of the detected values and use the sum as image entropy.

Image Entropy=Σ Object Information$_{score}$ (Object Information Including Score and Coordinate Information) [Equation 2]

In an example of FIG. 5, the image entropy of the upper image is 6.3346 (=1.1758(person)+1.8829(person)+0.9875 (plant)+1.0582(bottle)+1.2302(bottle)). The image entropy of the lower image is 2.4985 (=2.4985(person)).

FIG. 6 is a diagram showing an example of computing the processing priority of an object detection dataset in an image using image entropy according to an embodiment of the present invention.

Referring to FIG. 6, the data processing device may efficiently construct an object detection dataset by choosing a processing priority in each image using image entropy. To this end, the data processing device computes the image entropy of images using an image segmentation algorithm or an object detection model and chooses a predetermined number of images to be preferentially processed in descending order of the computed image entropy or when the computed image entropy is greater than or equal to a preset reference value.

For example, as shown in FIG. 6, among the images, an image of which the image entropy is 8.5 has the highest processing priority. When images to be processed are chosen in descending order of the image entropy or when the images are greater than or equal to a preset reference value, it is possible to construct a high-quality object detection dataset having more information although the same number of images are constructed due to limited cost and time.

Figure 7:
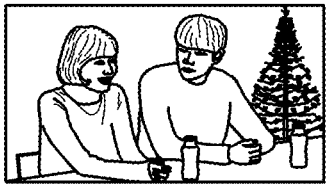
FIG. 7 is a diagram showing an example of computing the processing priority of an object detection dataset in a video using image entropy according to an embodiment of the present invention.
Figure 7:

FIG. 7 is a diagram showing an example of computing the task priority of an object detection dataset in a video using image entropy according to an embodiment of the present invention.

When an object detection dataset is constructed based on a video, a processing priority may be chosen in a similar manner to the method of choosing a processing priority in an image. In order to create an object detection dataset using a video, frame images are extracted from the video, and each image is divided into sections in units of a scene change in order to increase processing efficiency. In this case, the processing priority may be chosen using the average image entropy of each section. For example, as shown in FIG. 7, the average image entropy of images present in a predetermined section is computed, and a predetermined number of images to be preferentially processed are chosen in descending order of the computed average image entropy or when the computed average image entropy is greater than or equal to a preset reference value.

Figure 8:
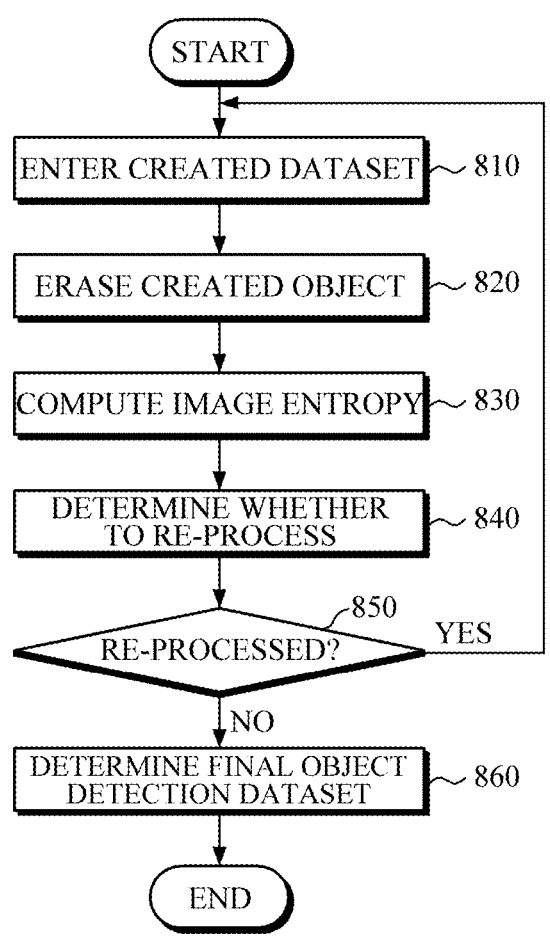
FIG. 8 is a flowchart illustrating an object detection dataset inspection method using image entropy according to an embodiment of the present invention.

FIG. 8 is a flowchart illustrating an object detection dataset inspection method using image entropy according to an embodiment of the present invention.

Referring to FIG. 8, a data processing device according to an embodiment uses an object detection dataset inspection method capable of finding a target to be re-processed (e.g., an image with missing object information or an image with incorrectly created object information) using image entropy and re-construct an object detection dataset.

According to the proposed inspection method, the data processing device receives a created object detection dataset (810) and erases, in various ways, objects that are created using object information (an object name, an object position, and the like) created for an image of the created object detection dataset (820).

Subsequently, the data processing device computes the image entropy of the dataset from which objects are erased (830). In the image entropy computation operation (830), the data processing device may compute image entropy using an object detection model or an image segmentation algorithm, such as Mean Shift.

Subsequently, the data processing device determines whether to perform re-processing using the computed image entropy (840). Image entropy may refer to the approximate number of objects present in an image. In the case that an image entropy reference value, which is a reference for re-processing determination, is 1.0, when the image entropy of a predetermined image is less than 1.0, the corresponding image is likely to no longer have objects to be created, and therefore the data processing device determines the corresponding image as a final object detection dataset. In contrast, when an image has an image entropy of 1.0 or more, the image is to be processed.

The image entropy reference value, which is a reference for—processing determination, may be preset and may be changed depending on the situation. When the image entropy reference value is set to be less than 1.0, the inspection is performed even if there is little object information, so the inspection can be performed strictly. In contrast, when the image entropy reference value is set to be greater than 1.0, the inspection may not be performed although there is some amount of object information, so the inspection can be performed loosely.

Subsequently, when an object detection dataset is not to be re-processed, the data processing device determines the object detection dataset as a final object detection dataset. When an object detection dataset is to be re-processed, the data processing device re-processes the object detection dataset, inspects the re-processed object detection dataset, and determines that the inspected object detection dataset is a final object detection dataset when the object detection dataset passes the inspection (850).

The object erasure (820), the image entropy computation (830), and the re-processing determination (840), which is a procedure of the inspection method, are automated through the data processing device, and thus it is possible to greatly improve efficiency.

FIG. 9 is a diagram illustrating a method of erasing an object according to an image entropy computation method according to an embodiment of the present invention.

Referring to FIG. 9, an object processing device erases pre-constructed object data (an object name and an object position) from an image in order to correctly inspect an object detection dataset using image entropy.

The object erasure method includes various methods such as black-out, white-out, filling with average color of a corresponding area, and filling with ambient color. An efficient object erasure method may be selected depending on the image entropy computation method. In the example of FIG. 9, the efficient object erasure method is classified according to two image entropy computation methods. For example, when the image entropy computation method is image entropy computation using an image segmentation algorithm, the object erasure method includes filling with ambient color, filling with a surrounding image, and the like. When the image entropy computation method is image entropy computation using an object detection model, the object erasure method includes black-out, white-out, filling with average color of a corresponding area, and the like.

Figure 10:
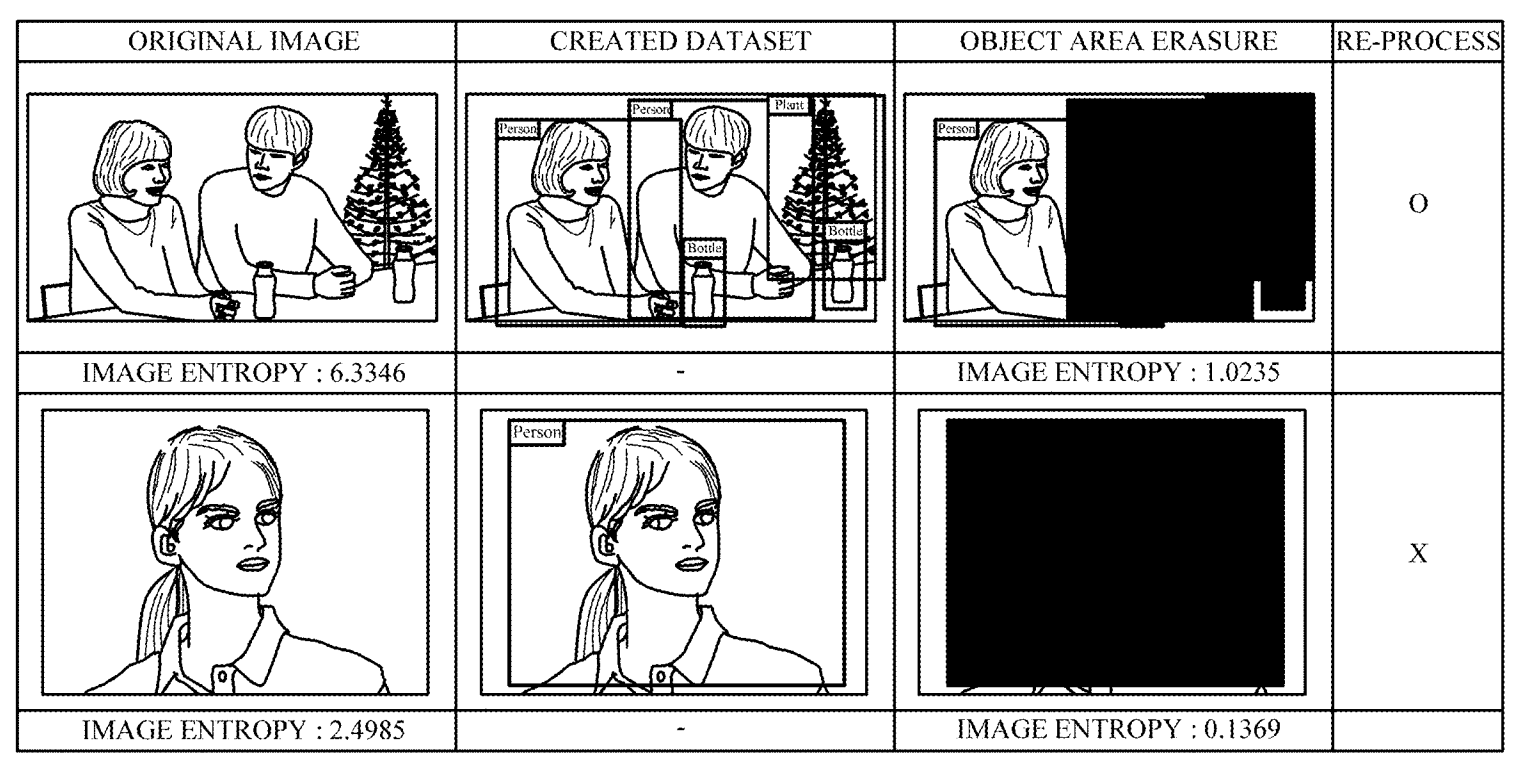

FIG. 10 is a diagram showing an example of an object detection dataset inspection method using image entropy according to an embodiment of the present invention.

Referring to FIG. 10, an object processing device creates an object detection dataset from original images, erases at least one object area from the created object detection dataset, and determines whether to re-process the object detection dataset using image entropy. The object processing device performs the same inspection method on an image to be re-processed after re-processing the image and determines that a corresponding object detection dataset is a final object detection dataset when the image passes the inspection.

A great deal of costs and resources are required to construct deep learning data. According to the present invention, by determining the priority of a data construction task using image entropy and performing the data construction task according to the determined priority, it is possible to redue costs and efficiently use resources.

Also, the present invention proposes that in the inspection process, an image segmentation algorithm or object detection model be used to compute image entropy and efficiently inspect uncreated or partially created data. By using this inspection method, efficiency can be achieved in a data inspection process, and thus it is possible to construct useful high-quality image metadata with limited resources as a whole.

So far, the present invention has been described with reference to embodiments thereof. It will be understood by those skilled in the art that various changes in form and details may be made therein without departing from the essential features of the present invention. Therefore, the disclosed embodiments should be considered in a descriptive sense only and not for purposes of limitation. The scope of the present invention should be defined not by the detailed description but by the appended claims, and all differences falling within a scope equivalent to the claims should be construed as being encompassed by the present invention.

What is claimed is:

1. A data processing device, comprising:
  a processor, configured to:
    receive multiple images;
    choose processing priorities of the received multiple images using image entropy and construct an object detection dataset from a corresponding image according to the chosen processing priorities as a constructed object detection dataset;
    store the constructed object detection dataset;
    perform an inspection to determine whether to re-process the constructed object detection dataset using image entropy;
    determine that the constructed object detection dataset is a final object detection dataset responsive to the constructed object detection dataset passing the inspection;
    erase at least one object from an image of the constructed object detection dataset using object information;
    compute image entropy of the image from which at least one object is erased; and
    determine an image to be re-processed using the computed image entropy.

2. The data processing device of claim 1, wherein the processor is further configured to:
  compute image entropy of each image using an image segmentation algorithm or an object detection model; and
  choose a predetermined number of images to be preferentially processed in descending order of the computed image entropy or when the computed image entropy is greater than or equal to a preset reference value.

3. The data processing device of claim 2, wherein the image entropy computation using the image segmentation algorithm comprises:
  segmenting each image into at least one color appearing in the corresponding image; and
  computing image entropy by dividing the number of segmentation color types by preset color sensitivity.

4. The data processing device of claim 2, wherein the image entropy computation using the object detection model comprises:
inputting a predetermined image to the object detection model;
detecting objects through the object detection model; and
computing image entropy by adding scores of the detected objects.

5. The data processing device of claim 1, wherein the processor is further configured to:
extract multiple frame images from the received multiple images;
classify the extracted multiple frame images into section images of preset sections;
compute average image entropy of each section from the section images of a corresponding section; and
choose a predetermined number of section images to be preferentially processed in descending order of the computed average image entropy or when the computed average image entropy is greater than or equal to a preset reference value.

6. The data processing device of claim 1, wherein, when image entropy is computed using an image segmentation algorithm, the processor is further configured to erase at least one object through filling with ambient color or filling with a surrounding image, and
wherein when image entropy is computed using an object detection model, the processor is further configured to erase at least one object through one of a black-out, a white-out, or a filling with an average color of a corresponding area.

7. The data processing device of claim 1, wherein, when the image entropy of the image from which at least one object is erased is greater than or equal to a preset reference value, the processor is further configured to determine whether the corresponding image is to be re-processed, and
wherein the preset reference value varies depending on a situation.

8. A method of constructing an object detection dataset using a data processing device, the method comprising:
receiving multiple images;
choosing processing priorities of the multiple images using image entropy;
constructing the object detection dataset from a corresponding image according to the chosen processing priorities as a constructed object detection dataset;
performing an inspection to determine whether to re-process the constructed object dataset using image entropy, wherein the performing of the inspection comprises:
erasing at least one object from an image of the object detection dataset using object information;
computing image entropy of the image from which at least one object is erased; and
determining an image to be re-processed using the computed image entropy;
determining that the constructed object detection dataset is a final object detection dataset responsive to a passing of the inspection;
re-processing the constructed object detection dataset responsive to a failing of the inspection to generate a reprocessed object detection dataset;
performing the inspection on the reprocessed object detection dataset; and
determining that the reprocessed object detection dataset is the final object detection dataset responsive to the reprocessed object detection dataset passing the inspection.

9. The method of claim 8, wherein the choosing of the processing priority comprises:
computing image entropy of each image using an image segmentation algorithm or an object detection model; and
choosing a predetermined number of images to be preferentially processed in descending order of the computed image entropy or when the computed image entropy is greater than or equal to a preset reference value.

10. The method of claim 8, wherein the choosing of the processing priority comprises:
extracting multiple frame images from the multiple images;
classifying the extracted multiple frame images into section images of preset sections;
computing average image entropy of each section from the section images of a corresponding section; and
choosing a predetermined number of section images to be preferentially processed in descending order of the computed average image entropy or when the computed average image entropy is greater than or equal to a preset reference value.

11. The method of claim 8, wherein the determining of an image to be re-processed comprises determining that a corresponding image is to be re-processed when the image entropy of the image from which at least one object is erased is greater than or equal to a preset reference value, and
wherein the preset reference value varies depending on a situation.

* * * * *